(12) United States Patent
Cai

(10) Patent No.: US 8,780,777 B2
(45) Date of Patent: *Jul. 15, 2014

(54) METHOD AND APPARATUS FOR USER EQUIPMENT FOR LONG TERM EVOLUTION MULTIMEDIA BROADCAST MULTICAST SERVICES

(75) Inventor: Zhijun Cai, Euless, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 275 days.

This patent is subject to a terminal disclaimer.

(21) Appl. No.: 11/737,987

(22) Filed: Apr. 20, 2007

(65) Prior Publication Data

US 2008/0259843 A1    Oct. 23, 2008

(51) Int. Cl.
*H04H 20/71*    (2008.01)

(52) U.S. Cl.
USPC .......... 370/312; 370/329; 455/450; 455/451; 455/180.1; 725/62

(58) Field of Classification Search
USPC .......... 370/312, 329–331; 455/450–452.2, 8, 455/509, 510, 516, 526; 725/62
See application file for complete search history.

(56) References Cited

U.S. PATENT DOCUMENTS

| | | | |
|---|---|---|---|
| 5,444,763 A | 8/1995 | Lazaridis et al. | |
| 6,563,794 B1 * | 5/2003 | Takashima et al. | 370/236 |
| 6,909,703 B2 | 6/2005 | Terry et al. | |
| 7,065,063 B2 | 6/2006 | Tran | |
| 7,158,801 B1 | 1/2007 | Muhonen | |
| 7,162,242 B2 | 1/2007 | Zhao et al. | |
| 7,184,708 B1 | 2/2007 | Kwa et al. | |
| 7,184,766 B2 | 2/2007 | Roberts | |
| 7,423,973 B2 | 9/2008 | Chen et al. | |
| 7,463,887 B2 | 12/2008 | Roberts et al. | |
| 7,471,948 B2 | 12/2008 | Farnsworth et al. | |
| 7,505,611 B2 | 3/2009 | Fyke | |
| 7,668,088 B2 | 2/2010 | Lai | |
| 7,747,256 B2 | 6/2010 | Hanov et al. | |
| 7,747,275 B2 | 6/2010 | Funnell et al. | |
| 7,751,403 B2 * | 7/2010 | Kim et al. | 370/394 |
| 7,796,605 B2 | 9/2010 | Pecen et al. | |

(Continued)

FOREIGN PATENT DOCUMENTS

| | | | |
|---|---|---|---|
| EP | 1475984 A1 | 11/2004 | |
| EP | 1 499 064 A1 * | 1/2005 | H04L 12/18 |

(Continued)

OTHER PUBLICATIONS

PCT International Search Report; PCT Application No. PCT/CA2008/000759; Aug. 8, 2008; 3 pgs.

(Continued)

*Primary Examiner* — Allahyar Kasraian
(74) *Attorney, Agent, or Firm* — Conley Rose, P.C.; Maria L. Sekul; J. Robert Brown, Jr.

(57) ABSTRACT

A user equipment is provided that includes a processor programmed responsive to receiving a point-to-multipoint (PTM) broadcast of a service at a low quality, to request a point-to-point (PTP) communication from the network. A method is provided for user equipment to receive a service. The method includes receiving a point-to-multipoint (PTM) broadcast of a service from a network, and attempting to obtain an improved quality of the service by requesting from the network a point-to-point (PTP) communication of the service.

8 Claims, 5 Drawing Sheets

(56) References Cited

U.S. PATENT DOCUMENTS

| | | | |
|---|---|---|---|
| 7,805,155 | B2 | 9/2010 | Chapman et al. |
| 7,813,261 | B2 | 10/2010 | Ma et al. |
| 7,889,689 | B2 | 2/2011 | Sebire |
| 8,089,911 | B2 | 1/2012 | Huang et al. |
| 8,208,498 | B2 | 6/2012 | Kitazoe et al. |
| 8,254,932 | B2 | 8/2012 | Hsu |
| 2001/0041025 | A1* | 11/2001 | Farahi ............... 385/14 |
| 2003/0086515 | A1* | 5/2003 | Trans et al. .......... 375/346 |
| 2003/0220119 | A1* | 11/2003 | Terry .............. 455/466 |
| 2003/0223394 | A1 | 12/2003 | Parantainen et al. |
| 2003/0228865 | A1 | 12/2003 | Terry |
| 2004/0131026 | A1 | 7/2004 | Kim et al. |
| 2004/0156332 | A1* | 8/2004 | Terry et al. ......... 370/328 |
| 2004/0224698 | A1* | 11/2004 | Yi et al. ............. 455/450 |
| 2005/0013326 | A1* | 1/2005 | Vinagre ............. 370/522 |
| 2005/0047359 | A1 | 3/2005 | Sebire |
| 2005/0135291 | A1 | 6/2005 | Ketchum et al. |
| 2005/0157666 | A1* | 7/2005 | Terry et al. ......... 370/310 |
| 2005/0169202 | A1 | 8/2005 | Ratasuk et al. |
| 2005/0169205 | A1* | 8/2005 | Grilli et al. ........ 370/313 |
| 2005/0176404 | A1 | 8/2005 | Hundscheidt et al. |
| 2005/0176427 | A1 | 8/2005 | Roberts |
| 2005/0216812 | A1* | 9/2005 | Leon et al. ......... 714/748 |
| 2005/0232271 | A1* | 10/2005 | Kettunen et al. ...... 370/390 |
| 2005/0232292 | A1 | 10/2005 | Richards |
| 2005/0245265 | A1* | 11/2005 | Nascimbene et al. ...... 455/447 |
| 2006/0023652 | A1 | 2/2006 | Vedantham et al. |
| 2006/0088009 | A1 | 4/2006 | Gibbs et al. |
| 2006/0171369 | A1 | 8/2006 | Ostrup et al. |
| 2006/0198377 | A1* | 9/2006 | Kubota ............. 370/394 |
| 2006/0203756 | A1 | 9/2006 | Hu |
| 2006/0217119 | A1* | 9/2006 | Bosch et al. ......... 455/435.2 |
| 2006/0221888 | A1 | 10/2006 | Sebire et al. |
| 2006/0252439 | A1 | 11/2006 | Cai |
| 2007/0191020 | A1* | 8/2007 | Fischer et al. ....... 455/452.2 |
| 2007/0230380 | A1* | 10/2007 | Bergstrom et al. ..... 370/310 |
| 2007/0253432 | A1 | 11/2007 | Regale et al. |
| 2008/0032735 | A1 | 2/2008 | Pecen |
| 2008/0070581 | A1* | 3/2008 | Charbit et al. ......... 455/450 |
| 2008/0159324 | A1 | 7/2008 | Bosch et al. |
| 2008/0181161 | A1* | 7/2008 | Kim et al. ......... 370/312 |
| 2008/0186957 | A1 | 8/2008 | Lai |
| 2008/0188228 | A1 | 8/2008 | Pecen et al. |
| 2008/0192669 | A1* | 8/2008 | Hus et al. .......... 370/312 |
| 2008/0233974 | A1* | 9/2008 | Xu ............... 455/458 |
| 2008/0267136 | A1* | 10/2008 | Baker et al. ........ 370/336 |
| 2010/0042882 | A1* | 2/2010 | Randall ............ 714/748 |
| 2010/0046632 | A1* | 2/2010 | Horn et al. .......... 375/240.25 |
| 2011/0149827 | A1 | 6/2011 | Na et al. |
| 2011/0235539 | A1 | 9/2011 | Cai et al. |
| 2011/0305183 | A1 | 12/2011 | Hsu et al. |
| 2012/0039181 | A1 | 2/2012 | Aziz et al. |
| 2012/0236776 | A1 | 9/2012 | Zhang et al. |

FOREIGN PATENT DOCUMENTS

| | | |
|---|---|---|
| EP | 1499061 A1 | 1/2005 |
| EP | 1499064 A1 | 1/2005 |
| EP | 1643786 A1 | 4/2006 |
| EP | 1650989 A1 | 4/2006 |
| EP | 1729535 A1 | 12/2006 |
| TW | 200816698 A | 4/2008 |
| TW | 200835211 A | 8/2008 |
| TW | 389491 B | 3/2013 |
| WO | 2004025978 A1 | 3/2004 |
| WO | 2005018107 A1 | 2/2005 |
| WO | 2005020520 A2 | 3/2005 |
| WO | 2005022835 A1 | 3/2005 |
| WO | 2005101738 A1 | 10/2005 |
| WO | 2005109925 A1 | 11/2005 |
| WO | 2011157216 A1 | 12/2011 |

OTHER PUBLICATIONS

PCT Written Opinion of the International Searching Authority; PCT Application No. PCT/CA2008/000759; Aug. 8, 2008; 5 pgs.
PCT International Search Report; PCT Application No. PCT/CA2008/000760; Aug. 8, 2008; 3 pgs.
PCT Written Opinion of the International Searching Authority; PCT Application No. PCT/CA2008/000760; Aug. 8, 2008; 6 pgs.
EP Search and Examination Report; EP Application No. EP 07109014, Dec. 18, 2007, 9 pgs.
3GPP TS 25.346, "3rd Generation Partnership Project; Technical Specification Group Radio Access Network; Introduction of the Multimedia Broadcast Multicast Service (MBMS) in the Radio Access Network (RAN); Stage 2 (Release 6)," Dec. 2005, pp. 1-59, V6.7.0 Technical Specification, 3GPP Organizational Partners.
Cai, Zhijun, U.S. Appl. No. 11/737,977; Title: "Polling Method and Apparatus for Long Term Evolution Multimedia Broadcast Multicast Services", filed Apr. 20, 2007; Specification 29 pgs; 5 Drawing Sheets (Figs. 1-8).
European Search Report; EP Application No. EP07109015; Sep. 11, 2007; 6 pgs.
Cai, Zhijun, U.S. Appl. No. 12/966,913; Title: "Polling Method and Apparatus for Long Term Evolution Multimedia Broadcast Multicast Services", filed Dec. 13, 2010.
Office Action dated Feb. 19, 2010; 35 pages; U.S. Appl. No. 11/737,977, filed Apr. 20, 2007.
Notice of Allowance dated Aug. 9, 2010; 12 pages; U.S. Appl. No. 11/737,977, filed Apr. 20, 2007.
European Second Examination Report dated Aug. 1, 2008; 4 pgs; EP07109014.6.
European Communication—Summons to Attend Oral Proceedings dated Jun. 9, 2009; 14 pgs; EP07109014.6.
PCT Notification of Transmittal of International Preliminary Report on Patentability ; PCT Application No. PCT/CA2008/000760; Sep. 9, 2009; 11 pgs.
European Search and Examination Report dated Mar. 16, 2010; 7 pgs.; EP Application No. 08733776.2.
European Communication dated Apr. 6, 2010; 1 pg.; EP Application No. 08733776.2.
European Notice of Allowance dated Aug. 25, 2009; 29 pgs; EP Application No. EP 07109015.3.
PCT International Preliminary Report on Patentability; PCT Application No. PCT/CA2008/000759; Aug. 31, 2009; 6 pgs.
Cai, Zhijun, U.S. Appl. No. 13/315,004; Title: "Polling Method and Apparatus for Long Term Evolution Multimedia Broadcast Multicast Services", filed Dec. 8, 2011.
Purnadi, Rene Waraputra; U.S. Appl. No. 13/209,927; Title: "Efficient Multimedia Broadcast Multicast Service Continuity Methods", filed Aug. 15, 2011.
3GPP TSG-RAN Meeting 51; "WID: Service Continuity and Location Information for MBMS for LTE"; Huawei; RP-110452; Kansas City, USA; Mar. 15-18, 2011; 6 pages.
3GPP TS 23.003 V10.2.0; 3rd Generation Partnership Project; Technical Specification Group Core Network and Terminals; Numbering, Addressing and Identification; Release 10; Jun. 2011; 80 pages.
3GPP TS 25.123 V10.1.0; 3rd Generation Partnership Project; Technical Specification Group Radio Access Network; Requirements for Support of Radio Resource Mangement (TDD); Release 10; Apr. 2011; 449 pages.
3GPP TS 33.401 V11.0.1; 3rd Generation Partnership Project; Technical Specification Group Services and System Aspects; 3GPP System Architecture Evolution (SAE); Security Architecture; Release 11; Jun. 2011; 115 pages.
3GPP TS 36.101 V10.2.1; 3rd Generation Partnership Project; Technical Specification Group Radio Access Network; Evolved Universal Terrestrial Radio Access (E-UTRA); User Equipment (UE) Radio Transmission and Reception; Release 10; Apr. 2011; 225 pages.
3GPP TS 36.133 V10.3.0; 3rd Generation Partnership Project; Technical Specification Group Radio Access Network; Evolved Universal Terrestrial Radio Access (E-UTRA); Requirements for Support of Radio Resource Management; Release 10; Jun. 2011; 457 pages.
3GPP TS 36.323 V10.1.0; 3rd Generation Partnership Project; Technical Specification Group Radio Access Network; Evolved Universal Terrestrial Radio Access (E-UTRA); Packet Data Convergence Protocol (PDCP) Specification; Release 10; Mar. 2011; 26 pages.
3GPP TS 36.331 V9.7.0; 3rd Generation Partnership Project; Technical Specification Group Radio Access Network; Evolved Universal

(56) References Cited

OTHER PUBLICATIONS

Terrestrial Radio Access (E-UTRA); Radio Resource Control (RRC); Protocol Specification; Release 9; Jun. 2011; 253 pages.
3GPP TS 36.443 V10.2.0; 3rd Generation Partnership Project; Technical Specification Group Radio Access Network; Evolved Universal Terrestrial Radio Access Network (E-UTRAN); M2 Application Protocol (M2AP); Release 10; Jun. 2011; 84 pages.
3GPP TS 36.444 V10.2.0; 3rd Generation Partnership Project; Technical Specification Group Radio Access Network; Evolved Universal Terrestrial Radio Access Network (E-UTRAN); M3 Application Protocol (M3AP); Release 10; Jun. 2011; 53 pages.
3GPP TS 45.008 V10.1.0; 3rd Generation Partnership Project; Technical Specification Group GSM/EDGE Radio Access Network; Radio Subsystem Link Control; Release 10; May 2011; 151 pages.
Office Action dated Mar. 22, 2011; U.S. Appl. No. 12/966,913, filed Dec. 13, 2010; 14 pages.
Interview Summary dated Sep. 8, 2011; U.S. Appl. No. 12/966,913, filed Dec. 13, 2010; 3 pages.
Notice of Allwance dated Oct. 11, 2011; U.S. Appl. No. 12/966,913, filed Dec. 13, 2010; 14 pages.
European Decision to Grant dated Feb. 3, 2011; EP Application No. 08733776.2; 1 page.
Extended European Search Report dated May 11, 2011; EP Application No. 11151733.0; 7 pages.
Canadian Office Action; Application No. 2,684,396; Aug. 7, 2012; 3 pages.
Final Office Action dated Jul. 5, 2011; U.S. Appl. No. 12/966,913, filed Dec. 13, 2010; 8 pages.
Office Action dated Mar. 1, 2012; U.S. Appl. No. 13/315,004, filed Dec. 8, 2011; 25 pages.
Notice of Allowance dated Jun. 6, 2012; U.S. Appl. No. 13/315,004, filed Dec. 8, 2011; 13 pages.
3GPP TS 36.443 V10.1.0; 3rd Generation Partnership Project; Technical Specification Group Radio Access Network; Evolved Universal Terrestrial Radio Access Network (E-UTRAN); M2 Application Protocol (M2AP); Release 10; Mar. 2011; 84 pages.
3GPP TSG RAN WG2 #73bis; "Service Continuity Scenario Analysis"; R2-111925; Shanghai, China; Apr. 11-15, 2011; 4 pages.
3GPP TSG-RAN WG2 Meeting #74; "Service Continuity Support for RRC Connected UE"; R2-113135; Barcelona, Spain; May 9-13, 2011; 3 pages.
3GPP TS 36.440 V10.0.1; 3rd Generation Partnership Project; Technical Specification Group Radio Access Network; Evolved Universal Terrestrial Radio Access Network (E-UTRAN); Multimedia Broadcast Multicast Service (MBMS) within E-UTRAN; Release 10; Mar. 2011; 11 pages.
3GPP TSG RAN WG2 #74; "Enhancing MBMS Service Continuity"; R2-113878; Athens; Aug. 20-24, 2011; 2 pages.
PCT International Search Report; Application No. PCT/US2011/065531; May 31, 2012; 6 pages.
PCT Written Opinion of the International Searching Authority; Application No. PCT/US2011/065531; May 31, 2012; 14 pages.
Office Action dated Apr. 8, 2013; U.S. Appl. No. 13/209,927, filed Aug. 15, 2011; 34 pages.
Office Action dated Aug. 7, 2013; U.S. Appl. No. 13/209,927, filed Aug. 15, 2011; 17 pages.
Final Office Action dated Dec. 16, 2013; U.S. Appl. No. 13/209,927, filed Aug. 15, 2011; 8 pages.
Notice of Allowance dated Mar. 3, 2014; U.S. Appl. No. 13/209,927, filed Aug. 15, 2011; 9 pages.
Taiwan Office Action; Application No. 101120777; Mar. 10, 2014; 16 pages.

* cited by examiner

METHOD AND APPARATUS FOR USER EQUIPMENT FOR LONG TERM EVOLUTION MULTIMEDIA BROADCAST MULTICAST SERVICES

BACKGROUND

Multimedia broadcast multicast services (MBMS) are multimedia and other services that may be communicated over a cellular network. For example, television station broadcasts or other streaming multimedia may be communicated over a cellular network to be received and displayed by user equipment. The MBMS may be communicated from an enhanced node B (ENB) to user equipment using point-to-point (PTP) communication or point-to-multipoint (PTM) communication.

PTP communication is similar to conventional cellular network communication in that there is a dedicated radio bearer between the ENB and the user equipment. PTP communication from the ENB may enable high quality communication with the user equipment in part because of the two-way nature of the communication between the user equipment and the ENB using various enhancements such as Hybrid-ARQ and the fast link adaptation. When a large number of user equipment communicate with an ENB using PTP communication, a substantial amount of overhead may be required for establishing and maintaining the PTP communications and a substantial amount of the available spectrum may be occupied.

PTM communication may include utilizing a dedicated channel or dedicated carrier to broadcast data or services to multiple users. While a certain amount of overhead may be required to initiate a broadcast PTM communication, the overhead is relatively small and may not vary in relation to the number of user equipment. That is, as more user equipment utilize the broadcast data or services, the overhead required to establish and maintain the broadcast PTM communication remains approximately the same. Broadcast PTM communications may also improve spectral efficiency as the number of user equipment increases because no new transmissions are required for new added users. In some cases, the quality of broadcast PTM communications may be less than that for PTP communications since there is little or no communication from the user equipment, power considerations, and other factors which may reduce the relative quality of the communication.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
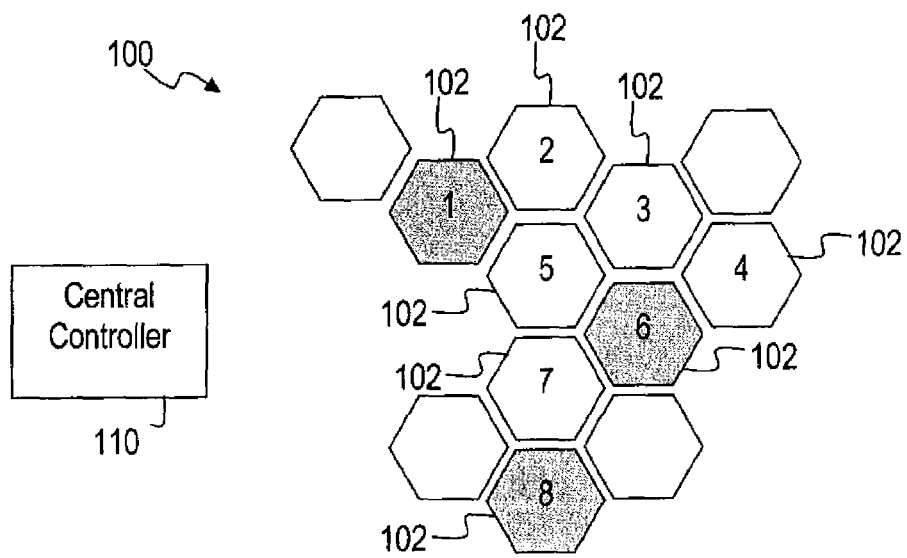
FIG. 1 is a diagram of an exemplary cellular network according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. This application is related to co-pending U.S. patent application No. 11/737,977, filed on even date herewith (issued as U.S. Pat. No. 7,852,795 on Dec. 14, 2010) entitled "Polling Method and Apparatus for Long Term Evolution Multimedia Broadcast Multicast Services," which is incorporated herein by reference for all purposes.

Disclosed herein is a system and method for communicating multimedia broadcast multimedia services (MBMS) and other services in a cellular network. In order to enable low overhead communication, when the system determines there may be one or multi-cell involves in the MBMS service delivery, upon just one user equipment within a cell of the multiple cells desiring a MBMS, the cell may communicate the MBMS in a broadcast point-to-multipoint communication. Each cell in the cellular network may determine whether or not any of the user equipment desire the MBMS through issuing a polling request in conjunction with a probability factor. The probability factor may be incrementally increased until either a user equipment responds to the polling request or a maximum probability factor is reached.

When two or more adjacent cells in the cellular network have user equipment that desire the same MBMS, a control component may establish a single frequency network to communicate the MBMS on the same resource in the adjacent cells so as to increase the quality of the broadcast point-to-multipoint communication. If user equipment within a cell receives the broadcast point-to-multipoint at low quality, the user equipment may request a point-to-point communication to increase the quality of communication.

In one embodiment, a device for wirelessly communicating a service to user equipment is provided. The device includes a transmitter, a receiver, and a processor. The processor is programmed to promote the transmitter polling to determine whether user equipment desire a service and responsive to receiving, via the receiver, at least one user equipment request for the service, the processor programmed to promote the transmitter providing a point-to-multipoint (PTM) broadcast of the service.

According to one embodiment, a cellular network is provided that includes a first device of a first cell in the cellular network, and a second device in a second cell in the cellular network. The cellular network also includes a central controller such that responsive to either of the first and second devices identifying a user equipment desiring a service provided by one of the first and second devices, the central controller promotes the first and second devices initiating a point-to-multipoint (PTM) broadcast of the service.

According to another embodiment, a method for providing a service is provided. The method includes polling a plurality of user equipment (UE) in a network to determine a response to a service, and responsive to at least one user equipment requesting the service, initiating a point-to-multipoint (PTM) broadcast of the service in the network.

In another embodiment, a user equipment is provided that includes a processor programmed responsive to receiving a point-to-multipoint (PTM) broadcast of a service at a low quality, to request a point-to-point (PTP) communication from the network.

In still another embodiment, a method is provided for user equipment to receive a service. The method includes receiving a point-to-multipoint (PTM) broadcast of a service from a network. The method includes attempting to obtain an improved quality of the service by requesting from the network a point-to-point (PTP) communication of the service.

FIG. 1 illustrates an exemplary cellular network 100 according to an embodiment of the disclosure. The cellular network 100 may include a plurality of cells $102_1$, $102_2$, $102_3$, $102_4$, $102_5$, $102_6$, $102_7$, and $102_8$ (collectively referred to as cells 102). As is apparent to persons of ordinary skill in the art, each of the cells 102 represent a coverage area for providing cellular services of the cellular network 100 through communication from an enhanced node B (ENB). The cellular services may include any service, including a multimedia multicast broadcast service (MBMS). While the cells 102 are depicted as having non-overlapping coverage areas, persons of ordinary skill in the art will recognize that one or more of the cells 102 may have partially overlapping coverage with adjacent cells. Further, while a particular number of the cells 102 are depicted, persons of ordinary skill in the art will recognize that more or less of the cells 102 may be included in the cellular network 100.

Each of the cells 102 within the cellular network 100 may operate to communicate MBMS and other services to user equipment (UE) using point-to-point (PTP) communication or using point-to-multipoint (PTM) communication. The UE may include any device that may communicate using the cellular network 100. For example, the UE may include devices such as a cellular telephone, a laptop computer, a navigation system, or any other devices known to persons of ordinary skill in the art that may communicate using the cellular network 100. In some embodiments, some of the cells 102 may only operate to communicate services using PTP communication and/or some of the cells 102 may only operate to communicate services using PTM communication.

As discussed in the background, a reduced quality of communication, and other negative factors may be considered when communicating data and services using a broadcast PTM communication. Due to these negative factors greater quality may be provided by communicating MBMS and other services using multiple PTP communications or a multicast PTM communication up to a certain number of the UE.

Typically the performance gain from using PTP communication may reduce when the number of users increase. For example, when many UE in one of the cells 102 want to utilize a MBMS or other service, it may become more efficient and improve the quality of the MBMS for one or more of the cells 102 to switch to a broadcast PTM communication. For example, upon the cell $102_2$ determining that the number of users interested in the service is large, the cell $102_2$ may decide to communicate the MBMS through a broadcast PTM communication. Complex counting algorithms, such as those defined in the universal mobile telecommunications system (UMTS) release 6 (R6), may be implemented at the cells 102 to determine how many UE are currently using a MBMS and how many UE are interested in using a MBMS or other service. Implementing these counting algorithms increases the communication overhead as well as the load on uplink access channels in the cells 102.

In order to increase the quality of broadcast PTM communications, the cellular network 100 may create a single frequency network (SFN). A SFN is created by two or more adjacent cells 102 communicating a MBMS on the same resource such as frequency or carrier using broadcast PTM communication. By broadcasting the same service on the same resource, the broadcast PTM communications of the adjacent cells 102 may constructively interfere with each other to increase the quality of the communication observed by the UE in each of the adjacent cells 102. Related U.S. patent application No. 11/737,984 filed on even date herewith, by Zhijun Cai, entitled "Multicast Control Channel Design,", is incorporated herein by reference for all purposes and provides disclosure of communication in a SFN.

Looking again at FIG. 1, the shaded cells 102 within the cellular network 100 may be communicating a MBMS or other service using one or more PTP communications. For example, using the counting algorithms described above, the cell $102_1$, the cell $102_6$, and the cell $102_8$ may have each individually determined that PTP communications with UE within their cell is more efficient. The cells 102 within the cellular network 100 that are not shaded may be communicating the MBMS using a SFN. For example, the cell $102_2$, the cell $102_3$, the cell $102_4$, the cell $102_5$, and the cell $102_7$ may all communicate the same MBMS on the same carrier using broadcast PTM communication.

Due to the increased performance of broadcast PTM communications when using a SFN, the performance gain from using PTP communication instead of broadcast PTM communication may be much reduced. This is in contrast to the example described above when a SFN is not used where the performance gain of PTP communication over broadcast PTM communication is still significant. Because each of the shaded cells 102 are communicating using PTP communication, there may be very few UE in each of these cells 102.

The quality of communication enabled by the SFN may be degraded by the shaded cells 102 using PTP communication and not contributing to the SFN. In other words, if the shaded cells 102 were to switch to a broadcast PTM communication on the SFN, then the quality of communication enabled by the SFN may further increase. As such, it may become more efficient and provide quality comparable to that of PTP communication by utilizing a SFN on all of the cells 102 that have UE interested in a MBMS or other services rather than individually optimizing each cell to determine when to switch from PTP communication to broadcast PTM communication. Even though the shaded cells 102 may have a low density of UE, the increase in the overall quality of communication in the cellular network 100 coupled with the overall decrease in overhead required to implement the counting algorithms may justify using broadcast PTM communication for a MBMS or other service even in cells 102 where there is a low density of interested UE.

In accordance with an embodiment, rather than determining how many UE desire a MBMS or other service, a simplified determination of whether or not there are any UE interested in a MBMS or other service may be performed. When two or more adjacent cells 102 have UE interested in a MBMS or other service, a central controller 110 may instruct the adjacent cells 102 to communicate the MBMS or other service on a SFN. The central controller 110 may provide centralized management and coordination for a plurality of enhanced node Bs (ENBs). The central controller 110 may poll each of the cells 102 to determine if there are any UE interested in a MBMS or other service. When two or more adjacent cells 102 have UE interested in the MBMS or other service, the central controller 110 may establish a SFN for broadcasting the MBMS or the other service on the adjacent cells 102.

Figure 2:
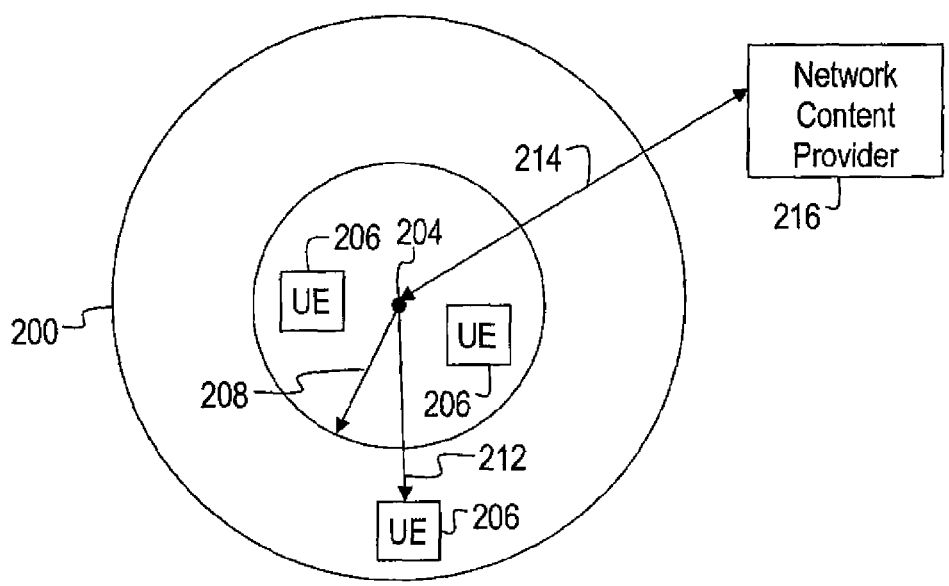
FIG. 2 is a diagram of an exemplary cell within a cellular network according to an embodiment of the disclosure.

FIG. 2 illustrates an exemplary cell 200 within the cellular network 100. The cell 200 includes an enhanced node B (ENB) 204 and a plurality of UE 206. The ENB 204 may receive a MBMS or other services through communication with a network content provider 216 over a backhaul network connection 214. Upon receiving the MBMS or other services, the ENB 204 may determine whether any of the UE 206 are interested in the MBMS or other services. While only three UE 206 are depicted within the cell 200, persons of ordinary skill in the art will recognize that there may be more or less UE 206 within the cell. Further, while the ENB 204 is show to be in communication with one network content provider 216, persons of ordinary skill in the art will recognize that the ENB 204 may be in communication with a plurality of content providers.

The UE 206 may each operate in a connected state or an idle state with the ENB 204. The UE 206 in the connected state are in active communication with the ENB 204, whereas the UE 206 in the idle state may be in range of the ENB 204, but not in active communication. For the UE 206 in the connected state, the ENB 204 may easily determine how many UE 206 are currently using the MBMS or other services.

In order to determine whether or not any of the UE 206 in an idle state are interested in the MBMS or other services, the ENB 204 may issue a polling request to the UE 206 within the cell. The polling request may include at least an indication of the MBMS or other services available at the ENB 204. When the ENB 204 issues the polling request, it may be detrimental if all of the UE 206 interested in a MBMS or other service corresponding with the polling request respond to the polling request. For example, the cell 200 may have 10,000 UE 206 and each of the UE 206 may be interested in receiving a MBMS or other service. If the ENB 204 issues a polling request to determine the interest in the MBMS or other service, a response by all of the UE 206 might overwhelm and crash the cell 200.

In order to mitigate the possibility of too many UE 206 responding to a polling request, a probability factor may be associated with the polling request. For example, a polling factor of 0.001 may be associated with the polling request such that around one in a thousand of the UE 206 within the cell 200 respond to the polling request. In an embodiment, the polling factor may be communicated along with the polling request to the UE 206. If the UE 206 is interested in the MSMB or other service identified in the polling request, then the UE 206 may utilize the polling factor in order to determine whether or not to respond to the polling request.

Following the example above with the cell 200 having 10,000 UE 206, a polling factor of 0.001 may reduce the expected response from a polling request to around 10 of the UE 206 if all 10,000 of the UE 206 within the cell 200 are interested in the MBMS or other service. On the other hand, if there are only 10 UE 206 within the cell 200 that are interested in a MBMS or other service, a probability factor of 0.001 may not result in any of the UE 206 responding to the polling request.

In the event the ENB 204 does not receive any responses from the UE 206 with a small probability factor, such as a probability factor of 0.001, then the probability factor may be incrementally increased until either at least one of the UE 206 responds to the polling request or the probability factor is 1. Upon any of the UE 206 responding to the polling request, the cell may begin a broadcast PTM communication of the MSMB or other service associated with the polling request. The ENB 204 may then transmits a stop counting command. With a probability factor of 1, if any of the UE 206 within the cell 200 are interested in the MBMS or other service associated with the polling request, then the UE 206 will respond to the polling request. If none of the UE 206 respond to the polling request with a probability factor of 1, then there are no UE 206 within the cell 200 that are interested in the MSMB or other service associated with the polling request.

Figure 3:
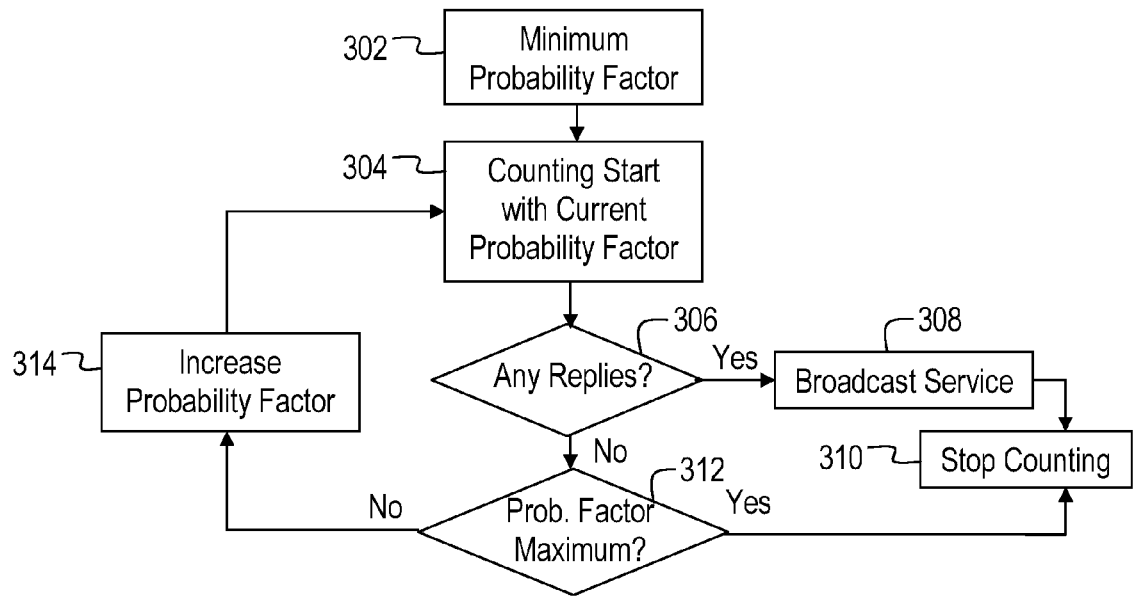
FIG. 3 is an exemplary method of determining when to switch from PTP communication to PTM communication within a cell of a cellular network.

FIG. 3 illustrates an exemplary method for determining whether any of the UE 206 within the cell 200 are interested in a MBMS or other service. At block 302, a minimum probability factor may be initiated, such as the probability factor 0.001. At block 304, a start counting command may be issued by the ENB 204 to the UE 206. The start counting command may include an indication of the MBMS or other service that is available at the ENB 205. If any of the UE 206 are interested in the MBMS or other service, the interested UE 206 may reply to the ENB 204 based on the probability factor.

At block 306, the ENB 204 determines if any of the UE 206 have responded to the start counting command. At block 308, when at least one of the UE 206 have replied, the ENB 204 may begin communicating the MBMS or other service using a broadcast PTM communication. Because the MBMS or other service initiates a broadcast PTM communication when just one UE 206 is interested in the MBMS or other service, at block 310, the ENB 204 may issue a stop counting command. The stop counting command may be issued in an effort to reduce additional UE 206 from responding to the start counting command such that the load of uplink access channels in the cell 200 is not greatly increased.

If the ENB 204 determines, at block 306, that none of the UE 206 have responded to the start counting command, then at block 312 the ENB 204 may determine whether the current probability factor is the maximum probability factor. If the ENB 204 determines that the probability factor is already at a maximum, then the stop counting command may be issued at block 310 as described above. If the ENB 204 determines, at block 312, that the current probability factor is not at the maximum, then at block 314 the ENB 204 may increase the probability factor and continue the process at block 304. In an embodiment, the ENB 204 may incrementally increase the probability factor by factors of ten. For example, the probability factor may have a minimum value of 0.001 and incrementally increase to 0.01, then 0.1 then to a maximum probability factor of 1. Persons of ordinary skill in the art will recognize that other probability factors and other incremental increases of probability factors may be used.

Looking back to FIG. 2, when communicating the MBMS or other services using a broadcast PTM communication, the ENB 204 may only be able to communicate the broadcast PTM communication at a high quality within a certain distance 208 of the ENB 204. The UE 206 located within the distance 208 may receive the broadcast MBMS or other service at a high quality, while the UE 206 located outside of the distance 208 may receive the MBMS or other service at a reduced quality.

While the distance 208 is depicted as a uniform distance from the ENB 204, persons of ordinary skill in the art will recognize that many factors may cause the distance 208 to vary. For example, geological and other environmental or physical factors may impact the distance 208 which UE 206 may receive a broadcast PTM communication from the ENB 204 at a sufficient quality. Also, cells adjacent to the cell 200 that are communicating on a SFN may increase the distance 208 such that the UE 206 may receive the broadcast PTM communication at high quality throughout the cell 200. Even when all of the cells 102 in the cellular network 100 communicate on a SFN, some of the UE 206 may receive the broadcast PTM communication at lower quality. For example, cell $102_4$ is located on the edge of the cellular network 100 such that some of the UE 206 may receive the broadcast PTM communication at lower quality.

Figure 4:
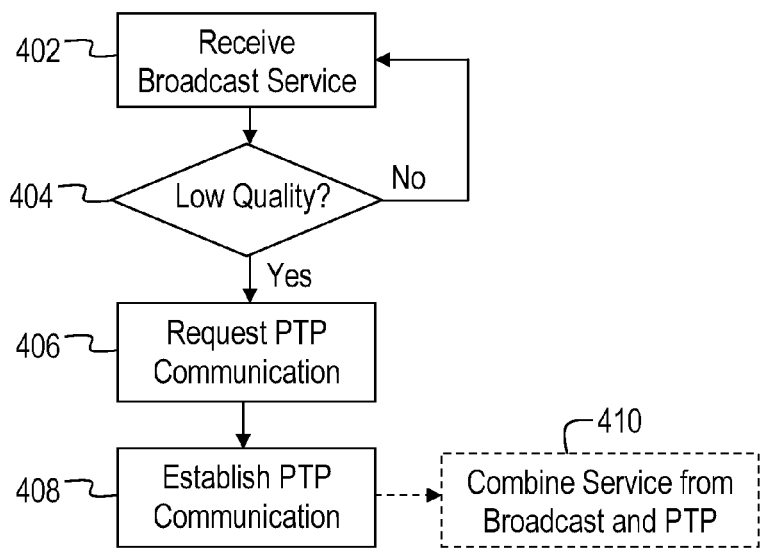
FIG. 4 is an exemplary method of requesting PTP communication in a broadcast PTM communication environment.

For the UE 206 that receive the broadcast PTM communication at low quality, the UE 206 may issue a request to the ENB 204 to initiate a PTP communication of the MBMS or other service. FIG. 4 illustrates an exemplary method for the UE 206 to issue a request for PTP communication. At block 402, the UE 206 may receive the broadcast PTM communication from the ENB 204. At block 404, the UE 206 may determine if the broadcast PTM communication is being received at a low quality. Where the UE 206 determines that the communication is not being received at low quality then the UE 206 continues to receive the broadcast PTM communication from the ENB 204 at step 402.

When the UE 206 determines that the communication is being received at low quality, the UE 206 may issue a request for PTP communication to the ENB 204, at block 406. At block 408, the ENB 204 and the UE 206 may establish a PTP communication such that the UE 206 may receive the MBMS or other services at higher quality. A normal PTP communication request may typically require communicating through the ENB 204 through the backhaul network connection 214 to the network content provider 216. Because the ENB 204 already has the MBMS or other service available for the broadcast PTM communication, it is not necessary to replicate the backhaul network connection 214. In this case the ENB 204 may more quickly and efficiently establish the PTP communication and provide the UE 206 with the MBMS or other service. At that point, the UE 206 may be receiving the MBMS or service from both the PTP communication and also from the PTM broadcast. In one embodiment at block 410, the UE 206 may include functionality to optionally combine and/or analyze the MBMS or other service received from both the PTP communication and the broadcast PTM communication to further increase the quality of the MBMS or other service.

Figure 5:
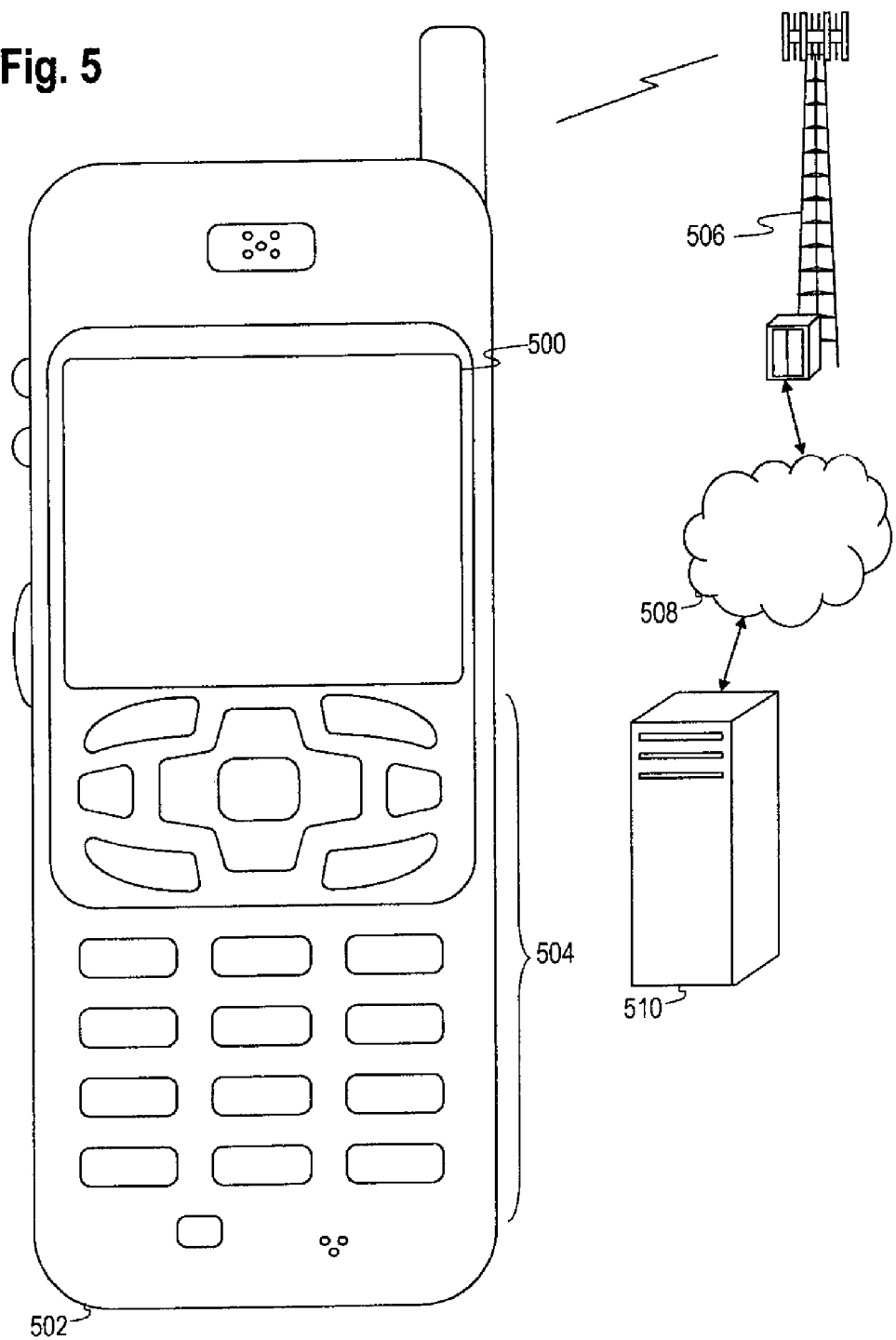
FIG. 5 is a diagram of a wireless communications system including a mobile device operable for some of the various embodiments of the disclosure.

FIG. 5 shows a wireless communications system including one embodiment of a mobile device 502. The mobile device 502 is operable for implementing aspects of the disclosure, but the disclosure should not be limited to these implementations. Though illustrated as a mobile phone, the mobile device 502 may take various forms including a wireless handset, a pager, a personal digital assistant (PDA), a portable computer, a tablet computer, or a laptop computer. Many suitable mobile devices combine some or all of these functions. In some embodiments of the disclosure, the mobile device 502 is not a general purpose computing device like a portable, laptop or tablet computer, but rather is a special-purpose communications device such as a mobile phone, wireless handset, pager, or PDA. In another embodiment, the mobile device 502 may be a portable, laptop or other computing device.

The mobile device 502 includes a display 500. The mobile device 502 also includes a touch-sensitive surface, a keyboard or other input keys generally referred as 504 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The mobile device 502 may present options for the user to select, controls for the user to actuate, and/or cursors or other indicators for the user to direct. The mobile device 502 may further accept data entry from the user, including numbers to dial or various parameter values for configuring the operation of the mobile device 502. The mobile device 502 may further execute one or more software or firmware applications in response to user commands. These applications may configure the mobile device 502 to perform various customized functions in response to user interaction.

Among the various applications executable by the mobile device 502 are a web browser, which enables the display 500 to show a web page. The web page is obtained via wireless communications with a cell tower 506, a wireless network access node, or any other wireless communication network or system. The cell tower 506 (or wireless network access node) is coupled to a wired network 508, such as the Internet. Via the wireless link and the wired network, the mobile device 502 has access to information on various servers, such as a server 510. The server 510 may provide content that may be shown on the display 500.

Figure 6:
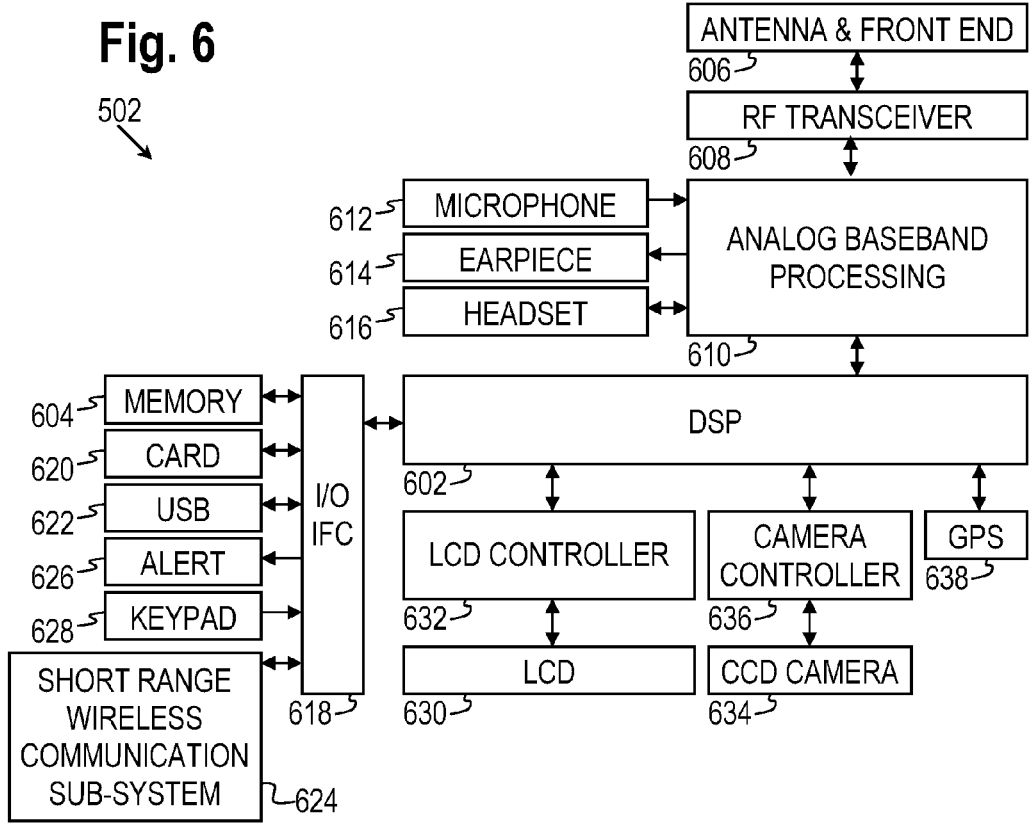
FIG. 6 is a block diagram of a mobile device operable for some of the various embodiments of the disclosure.

FIG. 6 shows a block diagram of the mobile device 502. The mobile device 502 includes a digital signal processor (DSP) 602 and a memory 604. As shown, the mobile device 502 may further include an antenna and front end unit 606, a radio frequency (RF) transceiver 608, an analog baseband processing unit 610, a microphone 612, an earpiece speaker 614, a headset port 616, an input/output interface 618, a removable memory card 620, a universal serial bus (USB) port 622, a short range wireless communication sub-system 624, an alert 626, a keypad 628, a liquid crystal display (LCD), which may include a touch sensitive surface 630, an LCD controller 632, a charge-coupled device (CCD) camera 634, a camera controller 636, and a global positioning system (GPS) sensor 638.

The DSP 602 or some other form of controller or central processing unit operates to control the various components of the mobile device 502 in accordance with embedded software or firmware stored in memory 604. In addition to the embedded software or firmware, the DSP 602 may execute other applications stored in the memory 604 or made available via information carrier media such as portable data storage media like the removable memory card 620 or via wired or wireless network communications. The application software may comprise a compiled set of machine-readable instructions that configure the DSP 602 to provide the desired functionality, or the application software may be high-level software instructions to be processed by an interpreter or compiler to indirectly configure the DSP 602.

The antenna and front end unit 606 may be provided to convert between wireless signals and electrical signals, enabling the mobile device 502 to send and receive information from a cellular network or some other available wireless communications network. The RF transceiver 608 provides frequency shifting, converting received RF signals to baseband and converting baseband transmit signals to RF. The analog baseband processing unit 610 may provide channel equalization and signal demodulation to extract information from received signals, may modulate information to create transmit signals, and may provide analog filtering for audio signals. To that end, the analog baseband processing unit 610 may have ports for connecting to the built-in microphone 612 and the earpiece speaker 614 that enable the mobile device 502 to be used as a cell phone. The analog baseband processing unit 610 may further include a port for connecting to a headset or other hands-free microphone and speaker configuration.

The DSP 602 may send and receive digital communications with a wireless network via the analog baseband processing unit 610. In some embodiments, these digital communications may provide Internet connectivity, enabling a user to gain access to content on the Internet and to send and receive e-mail or text messages. The input/output interface 618 interconnects the DSP 602 and various memories and interfaces. The memory 604 and the removable memory card 620 may provide software and data to configure the operation of the DSP 602. Among the interfaces may be the USB interface 622 and the short range wireless communication sub-system 624. The USB interface 622 may be used to charge the mobile device 502 and may also enable the mobile device 502 to function as a peripheral device to exchange information with a personal computer or other computer system. The short range wireless communication sub-system 624 may include an infrared port, a Bluetooth interface, an IEEE 802.11 compliant wireless interface, or any other short range wireless communication sub-system, which may enable the mobile device 502 to communicate wirelessly with other nearby mobile devices and/or wireless base stations.

The input/output interface 618 may further connect the DSP 602 to the alert 626 that, when triggered, causes the mobile device 502 to provide a notice to the user, for example, by ringing, playing a melody, or vibrating. The alert 626 may serve as a mechanism for alerting the user to any of various events such as an incoming call, a new text message, and an appointment reminder by silently vibrating, or by playing a specific pre-assigned melody for a particular caller.

The keypad 628 couples to the DSP 602 via the interface 618 to provide one mechanism for the user to make selections, enter information, and otherwise provide input to the mobile device 502. The keyboard 628 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 630, which may include touch screen capability and also display text and/or graphics to the user. The LCD controller 632 couples the DSP 602 to the LCD 630.

The CCD camera 634, if equipped, enables the mobile device 502 to take digital pictures. The DSP 602 communicates with the CCD camera 634 via the camera controller 636. The GPS sensor 638 is coupled to the DSP 602 to decode global positioning system signals, thereby enabling the mobile device 502 to determine its position. Various other peripherals may also be included to provide additional functions, e.g., radio and television reception.

Figure 7:
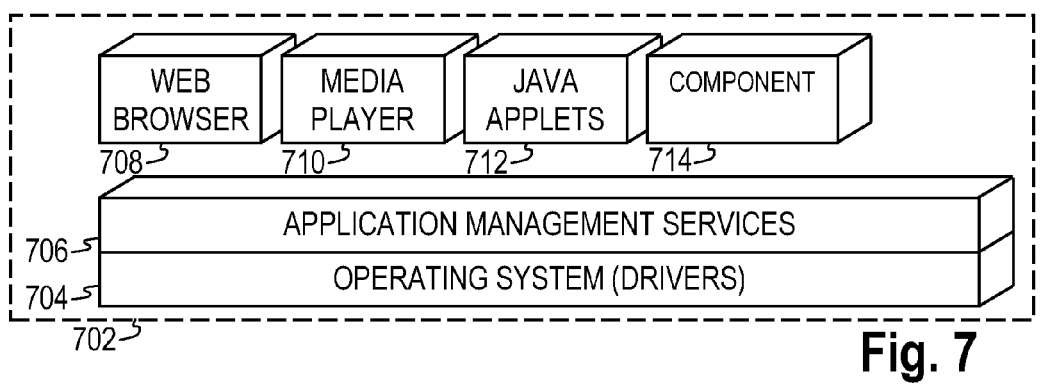
FIG. 7 is a diagram of a software environment that may be implemented on a mobile device operable for some of the various embodiments of the disclosure.

FIG. 7 illustrates a software environment 702 that may be implemented by the DSP 602. The DSP 602 executes operating system drivers 704 that provide a platform from which the rest of the software operates. The operating system drivers 704 provide drivers for the mobile device hardware with standardized interfaces that are accessible to application software. The operating system drivers 704 include application management services ("AMS") 706 that transfer control between applications running on the mobile device 502. Also shown in FIG. 7 are a web browser application 708, a media player application 710, and Java applets 712. The web browser application 708 configures the mobile device 502 to operate as a web browser, allowing a user to enter information into forms and select links to retrieve and view web pages. The media player application 710 configures the mobile device 502 to retrieve and play audio or audiovisual media.

The Java applets 712 configure the mobile device 502 to provide games, utilities, and other functionality. A component 714 might provide functionality related to aspects of the present disclosure, such as analyzing the communications or requesting PTP communication form the ENB as described above.

Figure 8:
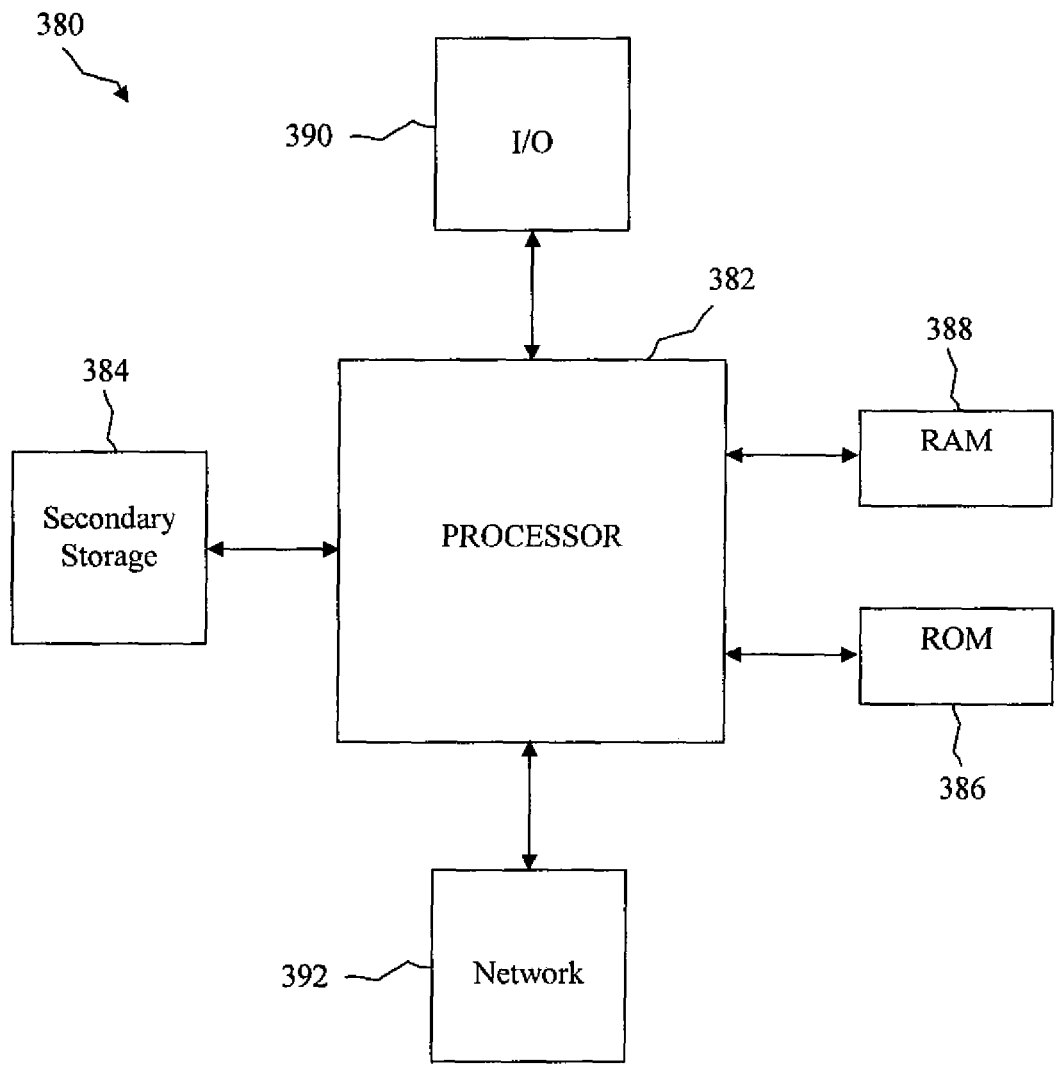
FIG. 8 is an exemplary general purpose computer according to one embodiment of the present disclosure.

The system described above, such as, but not limited to, the ENB 204 and network content provider 216 may be implemented on a general-purpose computer with sufficient processing power, memory resources, and network throughput capability to handle the necessary workload placed upon it. FIG. 8 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O 390 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity 392 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A user equipment, comprising:
 a processor programmed, based on a quality of a point-to-multipoint (PTM) broadcast communication received by the UE, to request a point-to-point (PTP) communication from the network, wherein the processor is further programmed, in response to simultaneously receiving both the PTM broadcast communication and the PTP communication, to combine portions of the PTM broadcast communication with the PTP communication to improve the broadcast communication received by the UE, wherein the PTP communication does not include a back-haul network connection to a content provider system.

2. The user equipment of claim 1 wherein content of a service associated with the PTM broadcast communication and the PTP communication is stored at a cell network.

3. The user equipment of claim 1 wherein the PTP communication and PTM broadcast communication is via by an enhanced node B of a cell in a long term evolution (LTE) network.

4. The user equipment of claim 1 wherein a service associated with the PTM broadcast communication and the PTP communication is a multimedia broadcast multicast service (MBMS).

5. The user equipment of claim 1, wherein the user equipment is one of group of user equipment consisting of mobile devices, mobile handsets, cellular telephones, mobile telephones, dual mode handsets, wireless telephones, laptop computer, tablet computers, portable computers, desktop and personal computers, televisions, set-top boxes, and personal digital assistants (PDAs).

6. A method for user equipment to receive a service, comprising:
 receiving a point-to-multipoint (PTM) broadcast communication of a service from a network;
 based on a quality of the PTM broadcast communication, attempting to obtain an improved quality of the service by requesting from the network a point-to-point (PTP) communication of the service;
 subsequent to requesting, simultaneously receiving both the PTM broadcast communication and the PTP communication; and
 combining portions of the PTM broadcast communication with the PTP communication to improve the quality of the PTM broadcast communication received by the UE: wherein the PTP communication does not include a back-haul network connection to a content provider system.

7. The method of claim 6, wherein the user equipment is one of group of user equipment consisting of mobile devices, mobile handsets, cellular telephones, mobile telephones, dual mode handsets, wireless telephones, laptop computer, tablet computers, portable computers, desktop and personal computers, televisions, set-top boxes, and personal digital assistants (PDAs).

8. The method of claim 6, wherein the PTP communication and PTM broadcast communication is via by an enhanced node B of a cell in a long term evolution (LTE) network, and wherein the service is a multimedia broadcast multicast service (MBMS).

* * * * *

UNITED STATES PATENT AND TRADEMARK OFFICE
CERTIFICATE OF CORRECTION

| | | |
|---|---|---|
| PATENT NO. | : 8,780,777 B2 | Page 1 of 1 |
| APPLICATION NO. | : 11/737987 | |
| DATED | : July 15, 2014 | |
| INVENTOR(S) | : Zhijun Gai | |

It is certified that error appears in the above-identified patent and that said Letters Patent is hereby corrected as shown below:

In the Claims

Column 12, Claim 5, Line 13 replace "one of group" with --one of a group--

Column 12, Claim 6, Line 32 replace ":" with --;--

Column 12, Claim 7, Line 37 replace "one of group" with --one of a group--

Signed and Sealed this
Seventh Day of October, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,780,777 B2  
APPLICATION NO. : 11/737987  
DATED : July 15, 2014  
INVENTOR(S) : Zhijun Cai Page 1 of 1

It is certified that error appears in the above-identified patent and that said Letters Patent is hereby corrected as shown below:

In the Claims

Column 12, Claim 5, Line 13 replace "one of group" with --one of a group--

Column 12, Claim 6, Line 32 replace ":" with --;--

Column 12, Claim 7, Line 37 replace "one of group" with --one of a group--

This certificate supersedes the Certificate of Correction issued October 7, 2014.

Signed and Sealed this  
Thirteenth Day of January, 2015

Michelle K. Lee  
*Deputy Director of the United States Patent and Trademark Office*